United States Patent [19]

Yokota

[11] Patent Number: 4,741,573
[45] Date of Patent: May 3, 1988

[54] SLIDING ROOF DEVICE

[75] Inventor: Chitoshi Yokota, Tokyo, Japan

[73] Assignee: Honda Giken Kogyo Kabushiki Kaisha, Tokyo, Japan

[21] Appl. No.: 785,476

[22] Filed: Oct. 8, 1985

[30] Foreign Application Priority Data

Oct. 9, 1984 [JP] Japan .................. 59-212260

[51] Int. Cl.$^4$ .................. B60J 7/05; B60J 7/057
[52] U.S. Cl. .................. 296/221; 296/214; 296/216; 296/223
[58] Field of Search .............. 296/211, 214, 216, 220, 296/221-223; 49/31, 63

[56] References Cited

U.S. PATENT DOCUMENTS

| 3,702,430 | 11/1972 | Knetsch | 318/468 |
|---|---|---|---|
| 4,331,359 | 5/1982 | Sheldon | 296/146 |
| 4,420,185 | 12/1983 | Bienert | 296/223 |
| 4,422,687 | 12/1983 | Kaltz et al. | 296/221 |
| 4,436,338 | 3/1984 | Jardin | 296/223 |
| 4,438,972 | 3/1984 | Katayama et al. | 296/223 |
| 4,502,726 | 3/1985 | Adams | 296/221 |
| 4,629,953 | 12/1986 | Inoue et al. | 296/223 X |

FOREIGN PATENT DOCUMENTS

| 0011116 | 1/1982 | Japan | 296/222 |
|---|---|---|---|
| 30568 | 7/1984 | Japan | 296/222 |

*Primary Examiner*—Dennis H. Pedder
*Attorney, Agent, or Firm*—Irving M. Weiner; Joseph P. Carrier; Pamela S. Burt

[57] ABSTRACT

A sliding roof device (100) comprises a panel transfer mechanism (11, 12, 13b, 31, 33, 34, 7, 21) for moving a sliding roof panel (2), which is adapted to open and close a roof opening (3a) of a vehicle's roof (1), between a closed position thereof and an open position thereof, a panel tilt-up mechanism (11, 12, 13a, 32, 33, 34, 7, 21) for moving the roof panel (2) between the closed position and a tilt-up position thereof, a sunshade (40) disposed under the roof panel (2) and adapted to also open and close the roof opening (3a), a reversible electric motor (51) for actuating the panel transfer mechanism and the panel tilt-up mechanism, and an operation switch mechanism (58a, 58b; 58a, 58c; 57) for actuating the electric motor (51) to thereby have the roof panel (2) moved between the closed position and the open position as well as between the closed position and the tilt-up position. The sliding roof device (100) further comprises a sunshade portion detecting mechanism (44) adapted to connect the operation switch mechanism (58a, 58b; 58a, 58c; 57) into actuation of the electric motor (51) under a condition that the sunshade (40) is put in a predetermined open position thereof.

5 Claims, 2 Drawing Sheets

SLIDING ROOF DEVICE

BACKGROUND OF THE INVENTION

1. Field of the Invention

The present invention generally relates to a sliding roof device for vehicles. More particularly, the invention relates to a sliding roof device for vehicles of the type which includes a transparent sliding roof panel, and a sunshade adapted to shield rays of light transmitted from outside through the roof panel, as it is put in a close position thereof.

2. Description of Relevant Art

Among known sliding roof devices for vehicles, there have been proposed those which included, for purposes such as of ventilation of a passenger accommodating room, a tilt-up mechanism adapted to lift up the rear part of a sliding roof panel from a close position thereof to thereby bring the roof panel into a tilt-up position thereof.

Some of such sliding roof devices further included a sunshade provided under the sliding roof panel and adapted to be longitudinally slidable between a position thereof below the opened part of a roof and another position thereof below the rear part of the roof, so that, in the case where the roof panel was transparent, those rays of light transmitted through the panel when it is in the close position could be effectively shielded and, in the case where the roof panel was non-transparent, the lower surface of the panel might preferably be decorated.

Those sliding roof devices including the sunshade as well as the tilt-up mechanism had inherently involved problems such that, even when the sliding roof panel was tilted up from the close position, there could be exhibited no effects such as of ventilation if the sunshade was kept closed. Additionally, the open-close conditions of the roof panel could not be visually confirmed if the sunshade was closed, thus resulting in the possibility that the driver might well leave the vehicle with the roof panel left as it was in the tilt-up position, which leads to additional problems such as of the protection against theft or undesired intrusion of rain water.

The present invention has been achieved to effectively solve such problems of conventional sliding roof devices for vehicles of the type described.

SUMMARY OF THE INVENTION

According to the present invention, there is provided a sliding roof device (100) comprising a roof panel (2) adapted to open and close a roof opening (3a) defined by an opened part (3) of a roof (1) and to be selectively movable between an close position thereof, an open position thereof, and a tilt-up position thereof, a sunshade (40) disposed under the roof panel (2) for blocking light coming through the roof opening (3a), a panel transfer means (11, 12, 13b, 31, 33, 34, 7, 21) for moving the roof panel (2) between the close position and the open position, a panel tilt-up means (11, 12, 13a, 32, 33, 34, 7, 21) for moving the roof panel (2) between the close position and the tilt-up position, a reversible electric motor means (51) for driving the panel transfer means (11, 12, 13b, 31, 33, 34, 7, 21) and the panel tilt-up means (11, 12, 13a, 32, 33, 34, 7, 21), a first operation switch means (58a, 58b) for actuating the motor means (51) to thereby have the roof panel (2) moved from the close position to the tilt-up position tion, a second operation switch means (58a, 58c) for actuating the motor means (51) to thereby have the roof panel (2) moved from the close position to the open position, a third operation switch means (57) for actuating the motor means (51) to thereby have the roof panel (2) moved from the open position as well as from the tilt-up position to the close position, and a sunshade position detecting means (44) adapted to drive the first operation switch means (58a, 58b) into actuation of the motor means (51) under a condition that the sunshade (40) is put in a predetermined open position thereof.

Accordingly, an object of the present invention is to provide a sliding roof device which permits easy visual confirmation of a roof panel as put in a tilt-up position thereof, thus effectively eliminating the fear that the roof panel might be left in the tilt-up position against a driver's will or before he or she becomes aware of it.

The above and further features, objects and advantages of the present invention will more fully appear from the following detailed description of a preferred embodiment of the invention when the same is read in conjunction with the accompanying drawings.

DETAILED DESCRIPTION OF THE PREFERRED EMBODIMENT

Figure 1A:
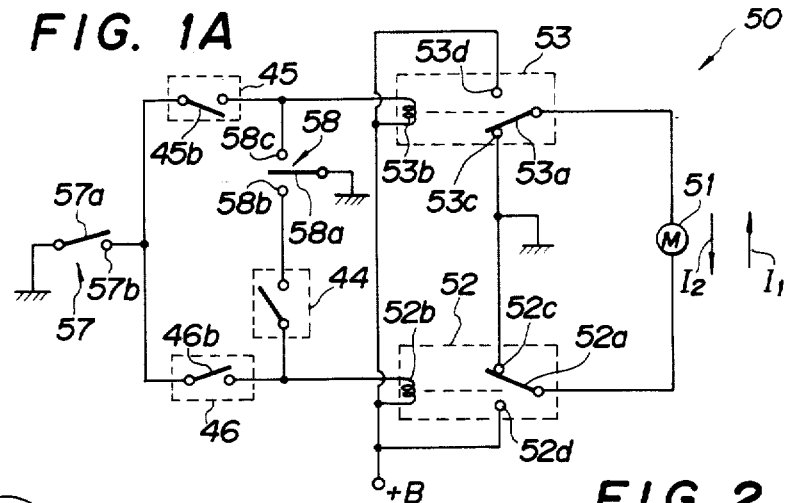
FIGS. 1A and 1B are a circuit diagram and a functional flow chart of a control circuit according to the invention.

First, with reference to FIGS. 3 to 6, the constitution of a sliding roof device including a roof panel and a sunshade will be described, and particularly regarding the respective positions that the roof panel and the sunshade are adapted to take when operated. The sliding roof device is controlled by a control circuit according to a preferred embodiment of the present invention, which control circuit will be detailed later in conjunction with FIGS. 1A and 1B.

In each of FIGS. 3 to 6, the left corresponds to the front of an automotive vehicle (not shown) equipped with the sliding roof device, and the right, to the rear thereof.

In those Figures, designated by reference numeral 100 is the entirety of the sliding roof device. The roof device 100 includes the roof panel designated by reference numeral 2, which panel 2 is made of a transparent glass and adapted to open and close an opening 3a defined by an opened part 3 of a roof 1 of the vehicle. The opening 3a has a substantially rectangular form when viewed from above.

Under the opened part 3 of the roof 1, the sliding roof device 100 has a roof frame 4 fixed to a vehicle body of the vehicle. The frame 4 extends substantially along a front portion and both side portions of the circumference of the roof opening 3a. It may preferably be further extended along a rear portion thereof, to serve as a stationary drain channel for draining water or rain drops dripping thereon from around the roof panel 2, as it is closed.

At both sides of the roof opening 3a are disposed a pair of guide rails 5 extending in the longitudinal direction of the vehicle. Under the rear side of the opened part 3, that is, under the front edge of a rear part 1b of the roof 1, there is arranged a mobile drain channel 6, extending in the transverse direction of the vehicle, for draining water or rain drops dripping thereon from the rear edge of the roof panel 2. Drain channel 6 is supported at both ends thereof with a pair of drain channel sliders 7 each respectively mounted on one of the guide rails 5 in a longitudinally slidable manner.

With the guide rails 5, 5 are engaged a pair of tilt-up sliders 12, respectively, which sliders 12 are longitudinally slidably operable with a pair of Bowden cables 11. In each of the sliders 12 is formed a winding elongate groove 13 having flat front portion 13a and an upwardly stepped rear portion 13b.

The rear part of the roof panel 2 is supported at both side portions thereof with a pair of rear stays 21.

In this respect, exemparily in FIG. 3, that portion of the roof panel 2 as represented by solid line is stretched between the front and the rear parts 1a, 1b of the roof 1, while that portion as represented by chained line is connected to the rear stays 21 and later-described front stays 41. This means that the panel 2 is upwardly convexed at the transversely central part thereof when viewed from the front of the vehicle. The connections between the mobile drain channel 6 and the channel sliders 7, which also might have been represented by chained line, are however omitted for the simplification of representation.

Each rear stay 21 is pivotably connected at the lower part thereof through a support shaft 35 to the rear end of a tilt-up arm 33, and to the front end of a drain channel arm 34, which is pivotably attached at the rear end thereof to the drain channel slider 7. The front part of the tilt up arm is engaged with the elongate groove 13 as a cam groove therefor by means of front and rear pins 31, 32 as followers fixed thereto.

Figure 3:
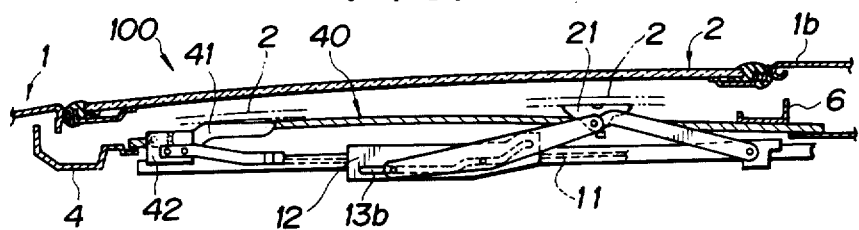
FIG. 3 is a side view of an essential part of a sliding roof, as it is in a state that a roof panel and a sunshade are put in close positions thereof, which sliding roof is controlled by the control circuit of FIG. 1A.
Figure 4:
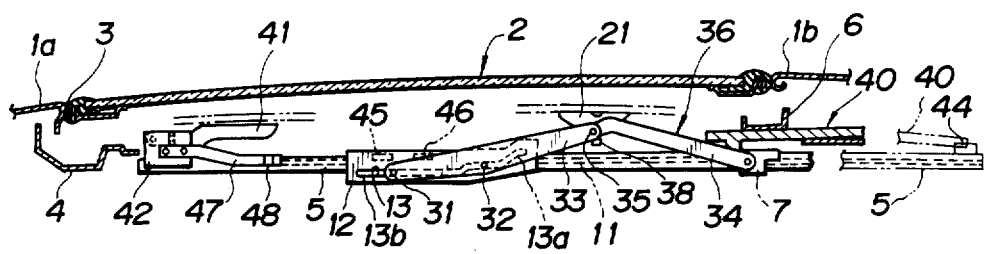
FIG. 4 is a side view of the essential part of the sliding roof of FIG. 3, as it is in a state where the sunshade is put in an open position thereof while the roof panel is left in the close position.
Figure 5:
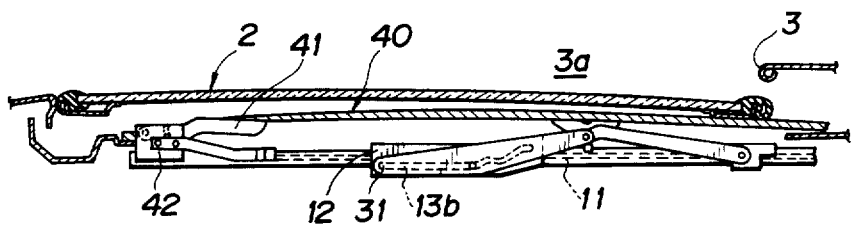
FIG. 5 is a side view of the essential part of the sliding roof of FIG. 3, as it is in a state where the roof panel is tilted down while the sunshade is put in the close position.
Figure 6:
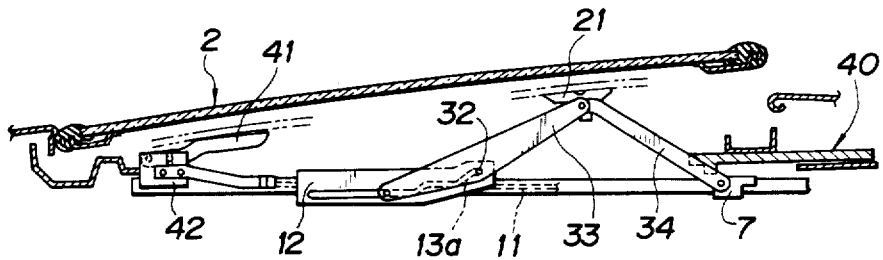
FIG. 6 is side view of the essential part of the sliding roof of FIG. 3, as it is in a state where the roof panel is tilted up while the sunshade is put in the open position.

In this embodiment, a tilt-up mechanism 36 is constituted with the panel actuating tilt-up sliders 12, both of the arms 33, 34, and other minor components, and is adapted such that, by operation of the Bowden cables 11, the tilt-up sliders 12 are forced to longitudinally slide, while causing the arms 33, 34 to swing up and down, to thereby bring the roof panel 2 into a full-close position thereof, a tilt-down position thereof, and a tilt-up position thereof shown in FIGS. 3, 5, and 6, respectively. The tilt-up mechanism is further adapted such that, when the tilt-up sliders 12 are forced to further retreat from a position thereof shown in FIG. 5, the roof panel 2 is brought from the tilt-down position into a full-open position (not shown) thereof, where it is stored under the rear part 1b of the roof 1. Incidentally, designated by reference numeral 38 of FIG. 4 is either of a pair of sliding members adapted to be brought into engagement with respective grooves of the guide rails 5, 5 to thereby restrict the vertical movements of the arms 33, 34 when bringing the roof panel 2 into the full-open position under the rear part 1b of the roof 1.

The support of the front part of the roof panel 2 is effected with the respective rear parts of left and right front stays 41 disposed thereunder, which stays 41 are pivotably supported at the front parts thereof by a pair of front sliders 42 longitudinally slidably engaged with the guide rails 5, respectively. In this respect, designated by reference numeral 47 of FIG. 4 is either of a pair of leaf springs fixed at the front parts thereof to the front sliders 42. Each spring 47 has formed in the rear part thereof a convex portion 48 engaged in a concave portion (not shown) formed in the side face of a corresponding one of the guide rails 5, to thereby effect the front end positioning of the roof panel 2. Such engagement of the convex portion 48 of the leaf spring 47 with the concave portion of the guide rail 5 is released by interference of the distal end part of a corresponding one of the Bowden cables 11, when actuating to rearwardly move the roof panel 2 from the full-close position.

In FIGS. 3 to 6, designated by reference numeral 40 is the sunshade made of a light-shielding material, which is disposed at a lower level than the mobile drain channel 6 and engaged at both sides thereof with the guide rails 5 so as to be longitudinally slidable between a position thereof below the roof opening 3a and another position thereof under the rear part 1b of the roof 1. However, when the roof panel 2 is put in the full-close position, the sunshade 40 is situated under the panel 2 so that rays of light as transmitted from outside through the panel 2 can be shielded.

For operatively moving the roof the Bowden cables 11 panel 2 are driven with a later-described motor, of which actuation is controlled such as by a sunshade sensor 44 as a limit sensor for detecting the sunshade 40, as it is put in a retreat limit position thereof, and by a tilt sensor 45 and a slide sensor 46 as position sensors for detecting either of the tilt-up sliders 12, as it is put in or moved beyond a predetermined position thereof, respectively.

In other words, the sunshade sensor 44 is installed on the rear end part of guide rail 5, to detect a full-open position of the sunshade 40.

Figure 7:
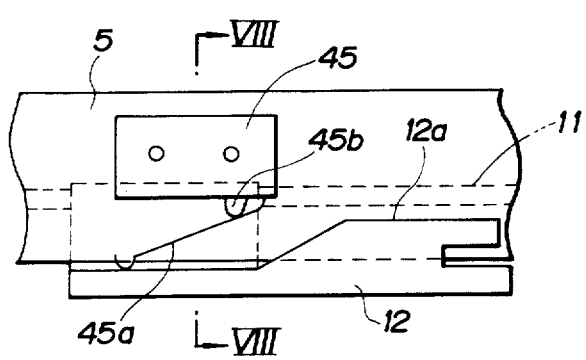
FIG. 7 is an enlarged plan view of a slider for actuating the roof panel of FIGS. 3 to 6.
Figure 8:
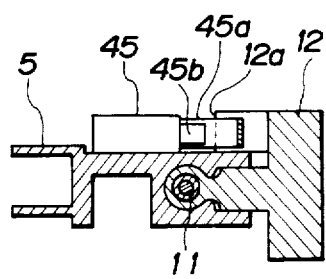
FIG. 8 is a sectional view taken along line VIII—VIII of FIG. 7.

The tilt sensor 45 is fixed on the transversely middle part of guide rail 5, as shown in FIGS. 7 and 8, to be operated by engagement with a cam portion 12a of tilt-up slider 12. More specifically, the sensor 45 comprises an elastically swingable engagement spring 45a as a follower in contact with the upper surface of tilt-up slider 12, and a micro-switch 45b operable with the spring 45a. When slider 12 is put in a position thereof shown in FIGS. 3 and 4 or rearwardly moved therefrom, the engagement spring 45a is not yet brought into engagement with the cam portion 12a of slider 12 and hence the switch 45b is left off. When slider 12 is moved frontwards beyond the position, that is, to the left thereof in FIGS. 3 and 4, the spring 45a is caused to swing upwardly by the cam portion 12a, thus operating to turn on the switch 45b.

Though not shown in FIGS. 7 and 8, the slide sensor 46 is analogous in structure to the tilt sensor 45 and has a micro-switch operable with a follower in contact with tilt-up slider 12. However, the relation between the on-off action of the sensor 46 and the position of tilt-up slider 12 is reversed to that between the sensor 45 and slider 12. In other words, when slider 12 is put in the position in FIGS. 3 and 4 or moved to the left therefrom, the switch of the sensor 46 is left off and, to the contrary, when slider 12 is moved to the right beyond the position of FIGS. 3 and 4, the switch is operated to be on.

Figure 1B:
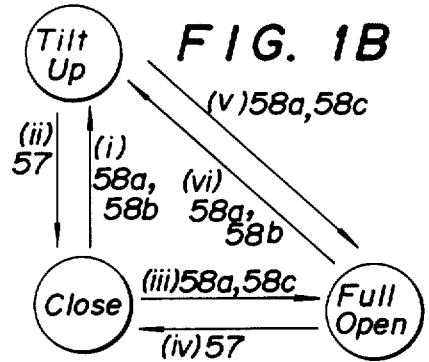

Referring to FIGS. 1A and 1B, description will now be made of the constitution as well as the function of the aforementioned control circuit for controlling the motor actuating the Bowden cables 11 of the sliding roof device 100.

In FIG. 1A, designated by reference numeral 50 is the control circuit, and 51 is the motor of an electric type. The direction of conduction of the armature current of the motor 51 is controlled by means of a pair of select switches 52, 53, which consist of a pair of mobile contacts 52a, 53a operable to be brought into contact with ground terminals 52c, 53c and with supply terminals 52d, 53d and a pair of exciting coils 52b, 53b for operating the contacts 52a, 53a, respectively. While the exciting coils 52b, 53b are not energized, the mobile contacts 52a, 53a are connected to the ground terminals 52c, 53c and, when the coils 52b, 53b are energized, the contacts 52a, 53a are brought into contact with the supply terminals 52d, 53d connected to a power source +B. The mobile contacts 52a, 53a are always connected to the motor 51.

The micro-switches 44, 45, 46, which all have a function of detecting a predetermined position of an object, are adapted to serve as the sunshade sensor, the tilt sensor, and the slide sensor, as described. The sunshade sensor 44 is adapted to become activated when the sunshade 40 is put in the full-open position (FIG. 4) and to be non-activated while the sunshade 40 is otherwise positioned. The tilt sensor 45 is non-activated while the roof panel 2 is kept in the full-close position (FIGS. 3 and 4), and becomes activated when the panel 2 enters a tilt-up position thereof (FIG. 6). The slide sensor 46 also remains off while the roof panel 2 is in the full-close position (FIGS. 3 and 4), whereas it becomes activated when tilt-up slider 12 is caused to retreat in the way of moving the panel 2 to the full-open position and at the full-open position of the panel 2.

The control circuit 50 includes manual switches 57 and 58 for manual operations, the former 57 being a close switch for panel closing operation, the latter 58 being a tilt-up/open select switch having a grounded mobile contact 58a normally put in a neutral position thereof. The contact 58a is manually operable to be brought into contact with a stationary terminal 58b for causing a tilt-up action of the panel 2 and with another stationary terminal 58c for opening the panel 2.

The sunshade sensor 44 is interposed between the tilt-up action oriented terminal 58b of the select switch 58 and a negative terminal of the exciting coil 52b, while the open action oriented terminal 58c of the switch 58 is connected to a negative terminal of the exciting coil 53b. The close switch 57 has two terminals: one being grounded, and the other being connected through the tilt sensor 45 and the slide sensor 46 to the negative terminals of the exciting coils 52b, 53b, respectively.

Thus constituted control circuit 50 has a number of functions illustrated by a flow chart of FIG. 1B, in which three circular nodes represent the predetermined positions of the roof panel 2: (a) the tilt-up position, (b) the full-close position to be hereinafter simply called "close" position, and (c) the full-open position to be hereinafter called "open" position.

The close switch 57 is adapted, when operated, to bring the roof panel 2 into the close position, whether the panel 2 is in the tilt-up position or the open position when switch 57 is activated.

In the tilt-up/open select switch 58, the mobile contact 58a cooperates with the stationary terminal 58b to constitute a "tilt-up" switch adapted to bring the panel 2 into the tilt-up position by a single continuous operation, whether the panel 2 is in the open position or the close position when the switch 58 is activated, provided that the sunshade sensor 44 is turned on with the sunshade 40 moved to the retreat limit position as shown in FIG. 4.

Further, in the select switch 58, the mobile contact 58a cooperates with the other stationary terminal 58c to constitute an "open" switch adapted to bring the roof panel 2 into the open position by a single continuous operation, whether the panel 2 is in the tilt-up position or the close position when the switch 58 is activated.

As will be understood from the foregoing description, the tilt sensor 45 and the slide sensor 46 both remain off while the roof panel 2 is in the close position, and exclusively become on when the panel 2 is removed from the close position to the tilt-up position and to the open position, respectively.

As shown in FIG. 1B, the control circuit 50 has six modes of operation. These operation modes will be detailed below one by one together with associated circuit function.

Operation mode (i) for moving the roof panel 2 from the close position to the tilt-up position:

It is first of all supposed that the roof panel 2 is put in the closed position, and the sunshade 40 is in the full-open position (FIG. 4), thus having turned on the sunshade sensor 44. Other circuit elements are as shown in FIG. 1A.

First, in the tilt-up/open select switch 58, when the mobile contact 58a is brought into contact with the terminal 58b, the exciting coil 52b of the select switch 52 is energized, connecting the mobile contact 52a to the supply terminal 52d, thus sending an armature current I1 to the motor 51 in such a direction that causes the Bowden cables 11 to also advance, forcing the tilt-up sliders 12 to advance, so that the panel 2 is moved from the close position to the tilt-up position (FIG. 6).

Thus, only when the sunshade sensor 44 is turned on with the sunshade 40 put in the full-open position will the roof panel 2 be permitted to be brought into the tilt-up position by operation of the "tilt-up" switch 58a–58b. When the sunshade 40 is otherwise positioned, the sunshade sensor 44 is non-activated, thus failing to permit the roof panel 2 to be brought into the tilt-up position.

When the roof panel 2 is put in the tilt-up position, the tilt sensor 45 is turned on, whereas the select switch 52 becomes non-activated when the mobile contact 58a of the switch 58 is righted to the neutral position upon completion of the tilt-up operation.

Operation mode (ii) for moving the roof panel 2 from the tilt-up position to the close position:

Upon completion of the operation mode (i), when the close switch 57 is turned on, there is conducted an exciting current through the tilt sensor 45 as kept on and the close switch 57, which current runs through the exciting coil 53b of the select switch 53, connecting the mobile contact 53a to the terminal 53d, thus sending an armature current I2 to the motor 51 in such a direction that causes the Bowden cables 11 to retreat, also forcing the tilt-up sliders 12 to retreat, so that the roof panel 2 descends at the rear part thereof to take the close position. The motor 51 is stopped when the tilt sensor 45 is turned off with the tilt-up sliders 12 further rearwardly moved. Thus, by operation of the close switch 57, the roof panel 2 is now again brought into the close position (FIG. 4), and automatically stopped at this position.

Operation mode (iii) for moving the roof panel 2 from the close position to the open position:

When the roof panel 2 is desired to be moved from the close position to the open position, the tilt-up/open select switch 58 is to be operated so as to connect the mobile contact 58a with the terminal 58c. With such operation, the exciting coil 53b of the select switch 53 is energized, connecting the mobile contact 53a to the terminal 53d, thus sending the armature current I2 to the motor 51 in the direction that causes the Bowden cables 11 to retreat, also forcing the tilt-up sliders 12 to retreat, so that the roof panel 2 first tilts down (FIG. 5) and then retreats to take the open position. As described, when the tilt-up sliders 12 are situated in the rear of the position shown in FIGS. 3 and 4, the slide sensor 46 is kept on, whereas the "open" switch 58a–58c is turned off when the mobile contact 58a is righted to the neutral position upon completion of the opening operation.

Operation mode (iv) for moving the roof panel 2 from the open position to the close position:

While the roof panel 2 is put in the open position, the slide sensor 46 is kept on. Under this condition, when the close switch 57 is turned on, there is conducted an exciting current through the slide sensor 46 as kept on and the close switch 57, which current runs through the exciting coil 52b of the select switch 52, connecting the mobile contact 52a to the terminal 52d, thus sending the armature current I1 to the motor 51 in the direction that causes the Bowden cables 11 to advance, also forcing the tilt-up sliders 12 to advance together with the roof panel 2. With advancement of the tilt-up sliders 12, the roof panel 2 comes to the position shown in FIG. 4, where the slide sensor 46 becomes non-activated, thus interrupting the conduction of electric current to the exciting coil 52b, stopping the motor 51, so that the panel 2 is automatically stopped at the close position.

Operation mode (v) for continuously moving the roof panel 2 from the tilt-up position to the open position:

Under the condition that the roof panel 2 is put in the tilt-up position (FIG. 6), when the mobile contact 58a of the "open" switch 58a–58c is operated to be connected to the open action oriented terminal 58c, then the select switch 53 becomes activated, sending the armature current I2 to the motor 51 in the direction that causes the Bowden cables 11 to retreat, as described, so that the panel 2 first tilts down (FIG. 5). While the "open" switch 58a–58c is kept on, the roof panel 2 continuously moves in the rearward direction to take the open position, whereas the "open" switch 58a–58c is turned off when the panel 2 is put in the open position.

Operation mode (vi) for continuously moving the roof panel 2 from the open position to the tilt-up position:

Under the condition that roof panel 2 is put in the open position and the sunshade sensor 44 is turned on with the sunshade 40 in the open position thereof, when the tilt-up/open select switch 58 is operated to connect the mobile contact 58a to the tilt-up action oriented terminal 58b, then the select switch 52 becomes activated, sending the armature current I1 to the motor 51 in the direction that causes the Bowden cables 11 to advance, as described, so that the panel 2 first closes (FIG. 4). While the "tilt-up" switch 58a–58b is kept on, the roof panel 2 further continuously moves to take the tilt-up position, whereas the "tilt-up" switch 58a–58b is turned off when the panel 2 is put in the tilt-up position.

Incidentally, in this embodiment, the motor 51 has an output shaft (not shown) thereof interconnected with the Bowden cables 11 by means of a slide clutch (not shown) of a suitable type, so that, in the operation modes (i) and (vi), the slide clutch exhibits a clutch function under such a condition that the "tilt-up" switch 58a–58b is still kept on when the panel 2 is brought into the tilt-up position. Such function will be exhibited also under the condition that, in the operation modes (iii) and (v), the "open" switch 58a–58c is still kept on when the roof panel 2 is brought into the open position.

Figure 2:
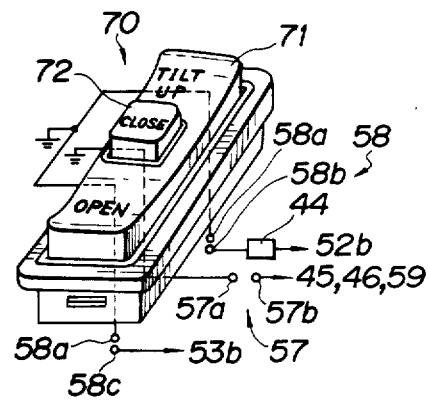
FIG. 2 is a perspective view showing a specifically embodied example of an operation switch of the control circuit of FIG. 1A.

With reference to FIG. 2, there will be described below the constitution of an operation switch 70 into which the aforementioned manual switches 57, 58 are specifically substantiated in a combination manner.

The operation switch 70 comprises a seesaw switch 71 and a pushbutton switch 72, which are both adapted to become activated when manually depressed and to be automatically righted to neutral positions thereof, by means of a spring (not shown), to thereby become non-activated when released from such depression.

In the sliding roof device 100, the roof panel 2 is kept from being tilted up while the sunshade 40 is closed, and will not be tilted up until the sunshade 40 is detected to be in the full-open position.

Incidentally, in this embodiment, the sunshade sensor 44 enters drive action when the full-open position of the sunshade 40 is detected. In this respect, however, such limit position to be detected may be voluntarily determined, provided that, at such position, the sunshade 40 is opened as wide as at least a part of the roof panel 2 so that its position can be visually confirmed.

Further, the roof panel 2 may be made of other material than a transparent glass.

As will be understood from the foregoing description, according to the present invention, a sliding roof panel is unable to be tilted up while an associated sunshade is closed or until the sunshade is opened a predetermined distance. By virtue of this arrangement the roof panel as tilted up can be always visually confirmed, thus eliminating such fear that, with the panel unknowingly left in a tilt-up position, the driver might well leave the vehicle undesirably exposed to theft and/or damage from rain.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

What is claimed is:

1. A sliding roof device (100) comprising:
 a roof panel (2) adapted to open and close a roof opening (3a) defined by an opened part (3) of a roof (1) and to be selectively movable between a closed position thereof, an open position thereof, and a tilt-up position thereof;

a sunshade (40) disposed under said roof panel (2) for blocking light coming through said roof opening (3a);

panel transfer means (11, 12, 13b, 31, 33, 34, 7, 21) for moving said roof panel (2) between said closed position and said open position;

panel tilt-up means (11, 12, 13a, 32, 33, 34, 7, 21) for moving said roof panel (2) between said closed position and said tilt-up position;

reversible electric motor means (51) for driving said panel transfer means (11, 12, 13b, 31, 33, 34, 7, 21) and said panel tilt-up means (11, 12, 13a, 32, 33, 34, 7, 21);

a first operation switch comprising a first operation switch means (58a, 58b) for actuating said motor means (51) to thereby have said roof panel (2) moved from said closed position to said tilt-up position, and a second operation switch means (58a, 58c) for actuating said motor means (51) to thereby have said roof panel (2) moved from said closed position to said open position;

a second operation switch (57) for manually actuating said motor means (51) to thereby have said roof panel (2) moved from said open position as well as from said tilt-up position to said closed position;

sunshade position detecting means (44) adapted to connect said first operation switch (58a, 58b) into actuation of said motor means (51) under a condition that said sunshade (40) is put in a predetermined open position thereof; and roof panel sensor switch means in an electrical circuit between the first and second operation switches to deactivate the motor means in the closed position.

2. A sliding roof device according to claim 1, wherein:

said sunshade position detecting means (44) comprises a sunshade sensor 44 interposed between said first operation switch means (58a, 58b) and said motor means (51) and adapted to close under the condition that said sunshade (40) is put in said predetermined open position.

3. A sliding roof device according to claim 1, wherein:

said predetermined open position of said sunshade (40) is a full-open position of said sunshade (40).

4. A sliding roof device according to claim 2, further comprising:

a first select switch (52) for actuating said motor means (51), as it is energized, to thereby have said roof panel (2) moved in a frontward direction of said roof (1);

a second select switch (53) for actuating said motor means (51), as it is energized, to thereby have said roof panel (2) moved in a rearward direction of said roof (2);

said first operation switch means (58a, 58b) being connected through said sunshade sensor (44) to said first select switch (52); and said second operation switch (58a, 58c) being connected to said second select switch (53).

5. A sliding roof device according to claim 4, wherein:

said second operation switch (57) is operatively interconnected with said first select switch (52) through a first sensor (46) adapted to close when said roof panel (2) is moved to said open position and with said second select switch (53) through a second sensor (45) adapted to close when said roof panel (2) is moved to said tilt-up position, whereby, when said second operation switch (57) is operated, either of said first and second select switches (52, 53) is selectively and exclusively operated, so that said roof panel (2), when it has been put in said open position or said tilt-up position, is brought into said closed position and, when put in said closed position, automatically stopped.

* * * * *

UNITED STATES PATENT AND TRADEMARK OFFICE
CERTIFICATE OF CORRECTION

PATENT NO. : 4,741,573
DATED : May 3, 1988
INVENTOR(S) : Chitoshi YOKOTA

It is certified that error appears in the above-identified patent and that said Letters Patent is hereby corrected as shown below:

```
Column 1, line 54, change "an" (first occurrence) to --a--;
          line 68, after "position" delete "tion".
Column 2, line 44, after "Figure 6 is" insert --a--.
Column 4, line 38, after "roof" insert --panel 2,--;
          line 39, after "11" delete "panel 2".
Column 6, line 46, delete "also";
          line 47, after "12 to" insert --also--.
Column 10, line 19 (claim 4, line 10), after "roof" change
"(2)" to --(1)--.
```

Signed and Sealed this

Fourth Day of October, 1988

Attest:

DONALD J. QUIGG

*Attesting Officer*   *Commissioner of Patents and Trademarks*